Feb. 18, 1964     L. J. ANDERSON ETAL     3,121,415
REMOTE CONTROL FOR MOTOR BOAT ENGINE AND STEERING CONTROLS
Filed Dec. 13, 1961     5 Sheets-Sheet 1

Lester J. Anderson
John W. Daley
    INVENTORS

BY Clarence A. O'Brien
and Harvey B. Jacobson
           Attorneys

Lester J. Anderson
John W. Daley
INVENTORS

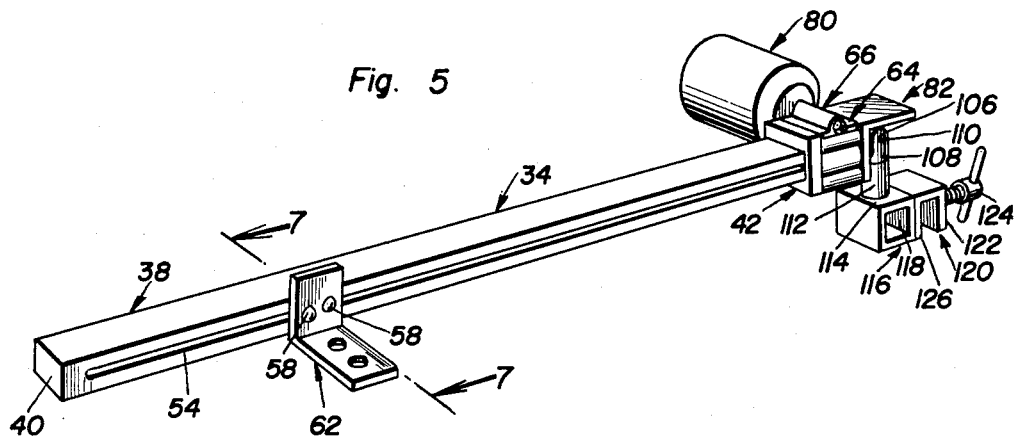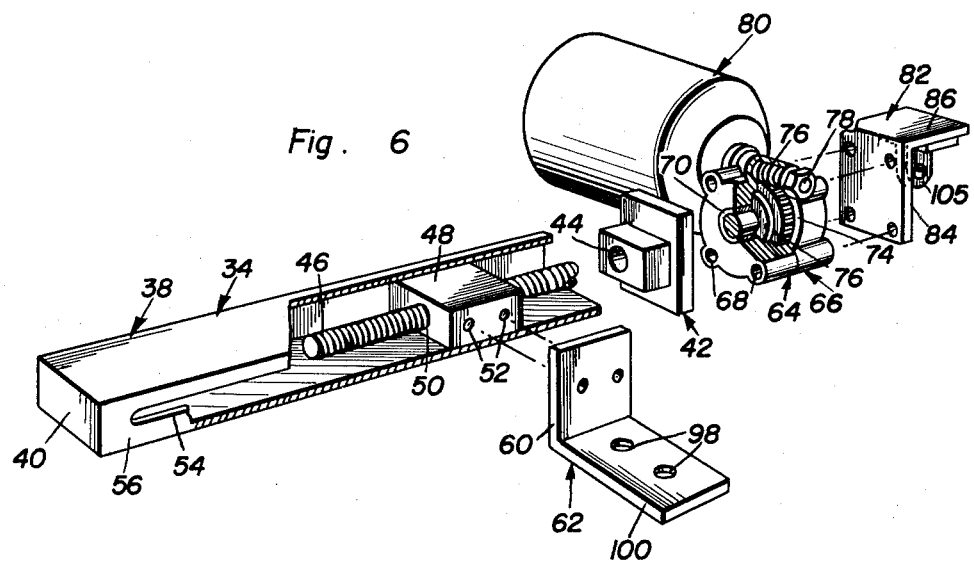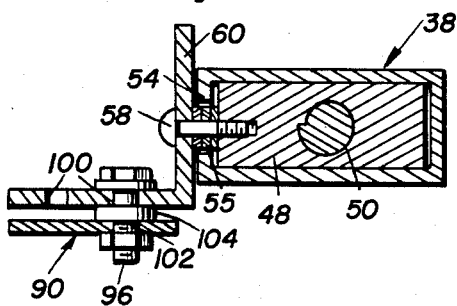
Lester J. Anderson
John W. Daley
INVENTORS

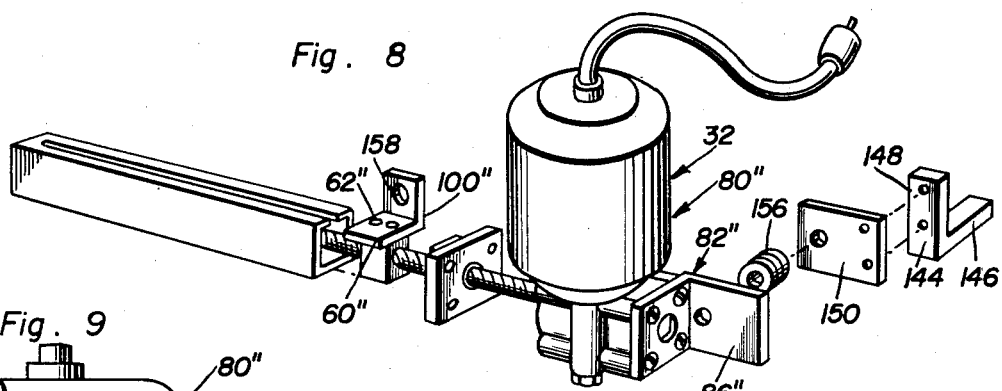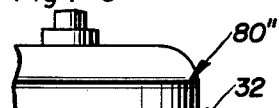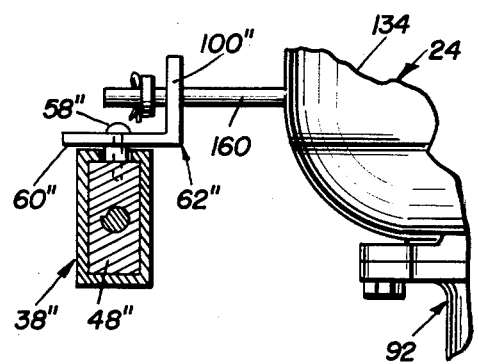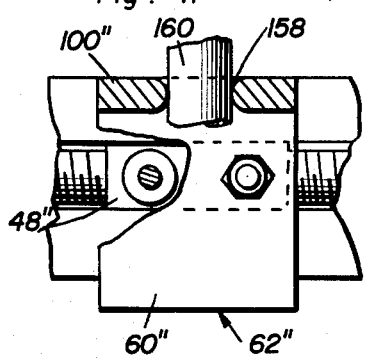
Lester J. Anderson
John W. Daley
INVENTORS

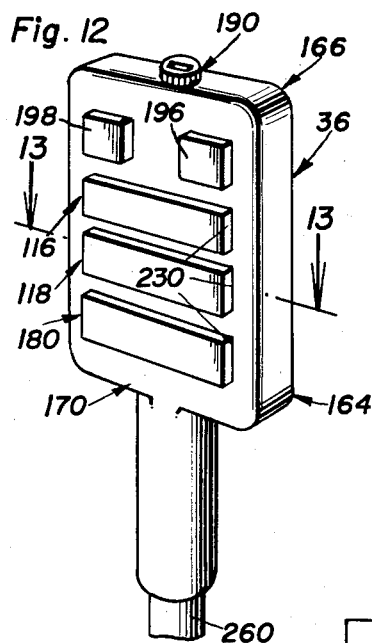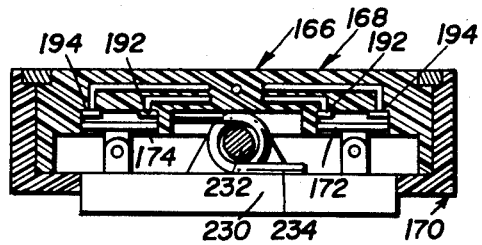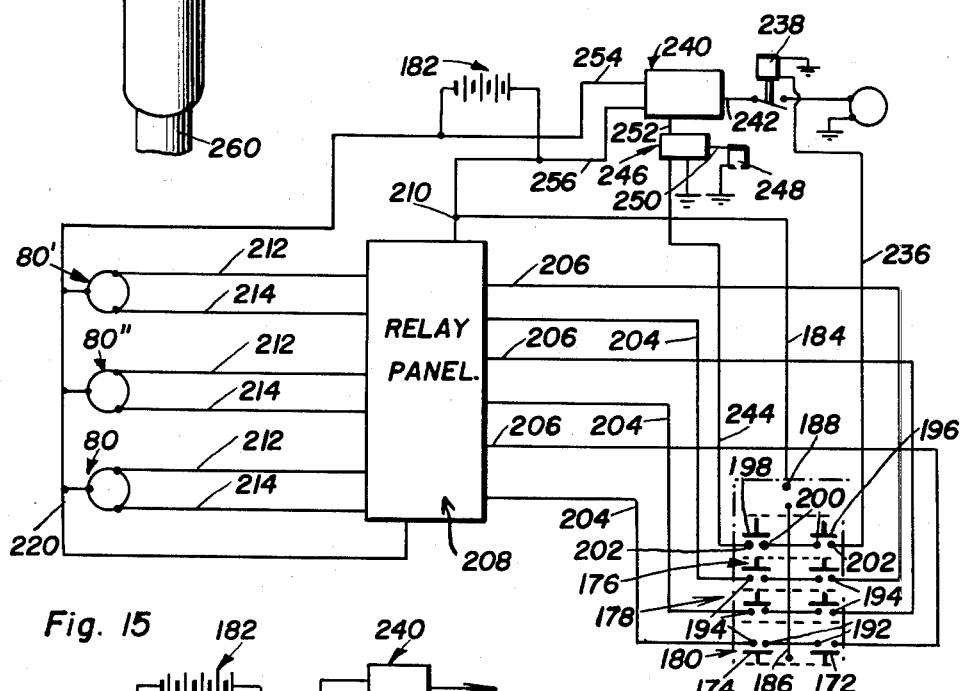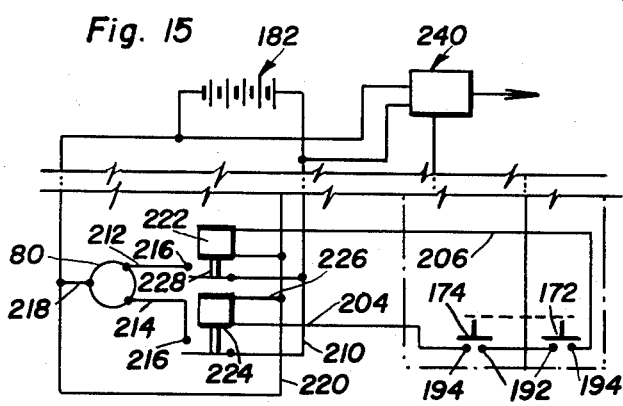
Lester J. Anderson
John W. Daley
INVENTORS

United States Patent Office 3,121,415
Patented Feb. 18, 1964

3,121,415
REMOTE CONTROL FOR MOTOR BOAT ENGINE
AND STEERING CONTROLS
Lester J. Anderson, Massillon, and John W. Daley,
Canton, Ohio, assignors to Marine Master, Inc., Massillon, Ohio, a corporation of Ohio
Filed Dec. 13, 1961, Ser. No. 159,010
7 Claims. (Cl. 115—18)

This invention relates to a novel and useful remote control for motor boat engine and steering controls.

Both inboard and outboard motor boats are provided with various engine controls such as controls for operating throttle, gear shift and steering linkages. In docking a boat or navigating a boat in a congested area the pilot of a boat, and especially those pilots who handle relatively large boats find it difficult to accurately gauge distances between the various outside surfaces of a boat and adjacent objects which must be cleared by the boat.

In some instances, larger boats are provided with fore and aft control stations which may each be used for controlling the movement of a boat. However, large outboard and inboard cruisers and the like are very rarely provided with two control stations from which the movements of the boat may be controlled and accordingly, it is difficult for a person piloting such a large cruiser to accurately judge distance between the boat and adjacent objects such as other boats and docks.

Accordingly, it is the main object of this invention to provide a remote control for motor boat engines and steering controls of the portable type and including a relatively small portable control panel which may be readily supported from one hand and operatively connected to the engine and steering controls of outboard and inboard motor boats by means of electrical circuits which may be readily energized by merely depressing suitable switch controls. In this manner, the pilot or operator of a boat may hold the remote control panel in one hand and move from one side of the boat to the other and from a point forward to a point astern of the normal control station of the boat while navigating the boat in close quarters. In this manner, the pilot of a boat may accurately ascertain the distance between his boat and adjacent objects.

A further object of this invention, in accordance with the preceding object, is to provide a remote control for motor boat engine and steering controls which may be readily modified so as to be adaptable for use with both inboard and outboard motor boat engine and steering controls. While the remote control of the instant invention is illustrated in the drawings as being used solely in conjunction with an outboard, it is to be understood that the remote control may readily be adapted for use with the engine control of an inboard engine and the steering controls of an inboard boat.

A further object of this invention, in accordance with the preceding objects is to provide a remote control which may be readily adapted for use in conjunction with various types of outboard and inboard motors.

A still further object of this invention is to provide a remote control including reversible motor means for the throttle gear shift and steering controls of a motor boat having incorporated a friction slip clutch assembly in each, which it drivingly connects to the reversible motor of each control and the actuator of the control whereby each of the motors may be actuated in either direction without danger of urging the throttle, shift lever and steering controls past their limit positions.

A final object to those specifically enumerated herein is to provide a remote control for motor boat engines and the steering controls which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is a perspective view of the third motor means of the remote control assembly which is used for steering the outboard motor;

FIGURE 6 is a fragmentary enlarged perspective view of the embodiment illustrated in FIGURE 5 with parts thereof being broken away and shown in section to more clearly illustrate the details of construction thereof;

FIGURE 7 is an enlarged transverse vertical sectional view taken substantially upon the plane indicated by section line 7—7 of FIGURE 5;

FIGURE 8 is an exploded perspective view of the second motor means of the remote control assembly which is utilized to actuate the shift control of the outboard motor;

FIGURE 9 is an enlarged fragmentary transverse vertical sectional view taken substantially upon the plane indicated by section line 9—9 of FIGURE 1;

FIGURE 10 is an enlarged transverse vertical sectional view taken substantially upon the plane indicated by section line 10—10 of FIGURE 1;

FIGURE 11 is an enlarged fragmentary horizontal sectional view taken substantially upon the plane indicated by section line 11—11 of FIGURE 2;

FIGURE 12 is a perspective view of the portable control panel of the remote control assembly;

FIGURE 13 is an enlarged horizontal sectional view taken substantially upon the plane indicated by section line 13—13 of FIGURE 12;

FIGURE 14 is a wiring diagram showing the manner in which the various pairs of actuating control means of the control panel may be electrically connected to the first, second, third motor means of the remote control assembly; and FIGURE 15 is an enlarged fragmentary portion of the wiring diagram illustrated in FIGURE 14.

Figure 1:
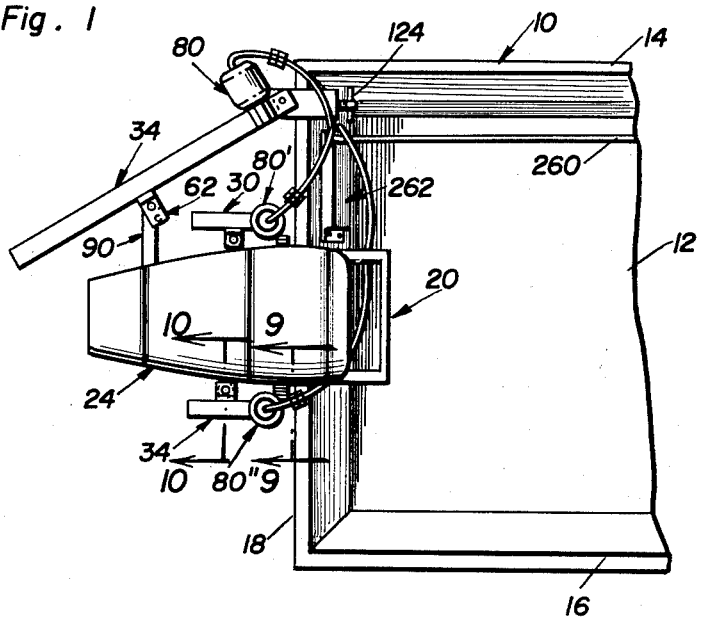
FIGURE 1 is a top plan view of the aft portion of an outboard motor boat showing the manner in which the first, second and third motor means of the remote control may be operatively connected to the throttle, shifting and steering controls of the outboard motor for actuating the same.
Figure 2:
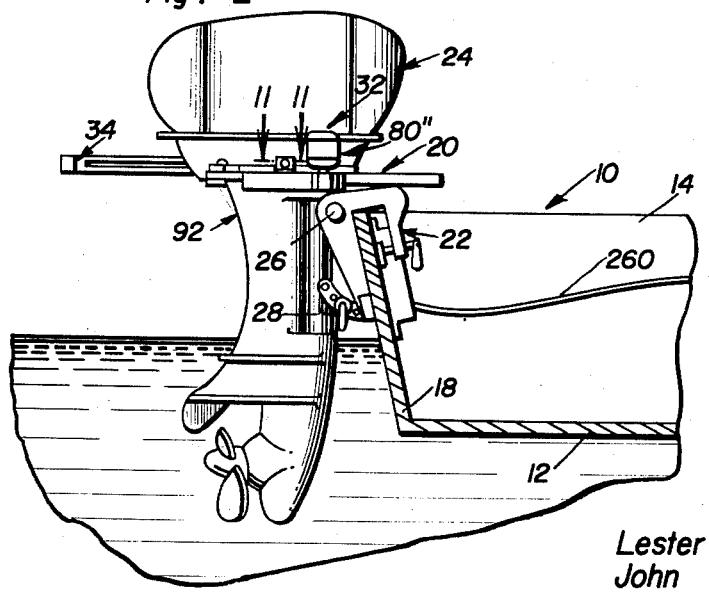
FIGURE 2 is a side elevational view of the embodiment illustrated in FIGURE 2 with parts of the boat being broken away and shown in section.

Referring now more specifically to the drawings the numeral 10 generally designates a boat which includes a bottom 12 and a pair of upstanding opposite sides 14 and 16 interconnected by means of a transom 18. An outboard motor generally referred to by the reference numeral 20 is mounted on the transom 18 by means of a generally inverted U-shaped clamp mounting bracket referred to in general by the reference numeral 22 to which the power head assembly generally referred to by the reference numeral 24 is tiltably connected by means of pivot pin 26 for swinging movement about generally horizontally disposed axis extending transversely of the boat 10. It will also be noted that the inverted U-shaped clamp assembly 22 mounts the power head 24 for oscillation about an upstanding axis by means of a piovtal connection between the pivot housing 28 of the clamp assembly 22 and the power head 24.

With reference now to FIGURES 1 through 4 of the drawings there will be seen first, second and third motor means generally referred to by the reference numerals 30, 32 and 34. The first, second and third motor means 30, 32 and 34 each comprise a part of the remote control assembly of the instant invention which is generally referred to by the reference numeral 36 and each of the motor means 30, 32 and 34 is similar to the others.

With attention now directed to FIGURES 5 and 6 of the drawings it will be seen that the third motor means 34 comprises a generally straight tubular member generally referred to by the reference numeral 38. The tubular member 38 includes an end wall 40 and an end plate assembly generally referred to by the reference numeral 42 which is carried by the end of the tubular member 38 remote from the end wall 40 and is secured thereto in any convenient manner. The end plate assembly 42 is provided with a centrally disposed opening 44 in which one end of a screw shaft member 46 is rotatably journalled. If it is desired, the other end of the screw shaft member 46 may be rotatably supported from the end wall 40. However, the tubular member 38 is rectangular in cross section and a rectangular slide member 48 is slidingly disposed therein and has a threaded bore 50 formed therethrough which threadedly receives the screw shaft member 46. The slide member 48 is provided with a plurality of threaded bores 52 on one side which are aligned with a slot 54 formed in the side walls 56 of the tubular member 38. Fasteners 58 are utilized to secure the flange 60 of an L-shaped bracket generally referred to by the reference numeral 62 to the slide member 48. It will be noted that the fasteners 58 may be provided with suitable shoulders for maintaining the flange 60 in spaced relation relative to the side wall 56 of the tubular member 38.

A friction slip clutch assembly generally referred to by the reference numeral 64 enclosed in a housing generally referred to by the reference numeral 66 is secured to the end plate assembly 42 by means of fasteners past through the bores 68 formed in the housing 66 and threadedly engaged in the end plate assembly 42. The housing 66 includes a sleeve bearing 70 which also rotatably journals the end of the screw shaft member 46 remote from the end wall 40 and a pair of friction washers 72 are keyed to the shaft member 46 and disposed on opposite sides of a gear wheel 74 which is rotatably journalled on the shaft member 46 and is in toothed engagement with a worm gear 76 carried by the output shaft 78 of a reversible electric motor generally referred to by the reference numeral 80. An L-shaped mounting bracket generally referred to by the reference numeral 82 and including a base flange 84 and a mounting flange 86 is secured to the side of the housing 66 remote from the end plate assembly 42 by means of the same fasteners utilized to secure the housing 66 to the end plate assembly 42.

Each of the first, second and third motor means 30, 32 and 34 is substantially identical to the portions of the third motor means 34 as set forth above with the exception that the mounting flanges 62 and 82 may be reversed in position as desired, the mounting brackets 60 and 62 may be alternately positioned as desired and the various tubular members may be rotated about their longitudinal axis relative to the corresponding reversible electric motors. It may be observed from FIGURE 6 in the drawings that the openings 68 are disposed equal distances from the sleeve bearing 70 and that the end plate assembly 42 may be rotated about the longitudinal axis of the bore 44 relative to the housing 66 if desired.

As can best be seen from FIGURE 7 of the drawings, the fasteners 58 utilized to hold the flange 60 in engagement wtih the slide member 48 are provided wtih a plurality of washers 55 which are receivable through the slots 54 and define a shoulder against which the flange 60 may bear to maintain the flange 60 in spaced relation relative to the slide member 48 and the slide wall 56 of the tubular member 38.

While the tubular member 38 of the third motor means 34 is somewhat longer than the corresponding tubular members of the first and second motor means 30 and 32 and the screw shaft member 46 of the third motor means 34 is also longer than the corresponding screw members of the motor means 30 and 32, each of the motor means 30, 32 and 34 are substantially identical although different pitch threads on the screw shaft members 46 and corresponding slide members 48 may be utilized. Further, the mounting brackets of the first and second motor means 30 and 32 corresponding to the mounting brackets 62 and 82 may be formed differently than the mounting brackets 62 and 82 in order to adapt the motor means 30 and 32 to operate at different controls of the outboard motor 20.

With attention now directed to FIGURES 3 and 5 through 7 it will be noted that a special steering bracket assembly generally referred to by the reference numeral 90 is secured to the undersurface of the upper end of the upstanding shaft housing generally referred to by the reference numeral 92 of the outboard motor 20 by means of fasteners (not shown) secured through the bores 94 formed in the shaft housing 92 and which are normally used to secure the shaft housing 92 to the power head assembly 24. The outer end of the steering bracket assembly 90 is provided with an upstanding pivot 96. The pivot pin 96 is secured through one of the apertures 98 formed in the flange 100 of the mounting bracket 62 and also through an aperture 102 formed in the steering bracket assembly 90. It will be noted that a washer 104 is disposed between the confronting surfaces of the flange 100 and the steering bracket assembly 90.

The mounting bracket 82 has a depending apertured ear 105 secured thereto in any convenient manner and the bifurcated end 106 of a rod-like member 108 is pivotally secured to the apertured ear 86 by means of a pivot pin 110. The rod-like member 108 includes a threaded shank portion (not shown) on the end remote from the bifurcated end 106 and the shank portion extends through a cylindrical member 112 and the side 114 of a tubular mounting block generally referred to by the reference numeral 116 in any convenient manner. The mounting block 116 has its side 118 secured to a generally inverted U-shaped clamp assembly referred to in general by the reference numeral 120 and it will be noted that the leg 122 of the clamp assembly 120 has a screw member 124 threadedly engaged therewith which extends through the leg 122 and clamps the transom 18 of the boat 10 between the screw member 124 and the leg 126 which opposes the leg 122. Accordingly, it will be noted that the end of the third motor means 34 adjacent the reversible motor 80 is swivelly connected to the clamp assembly 120. Still further, it will be noted that the leg 126 is pivotally secured to the side 118 by means of any suitable pivot fastener (not shown) wherein the leg 126 is pivotally secured to the side 118 for rotation about an axis generally paralleling the longitudinal center line of the screw member 124.

Accordingly, it will be seen that upon actuation of the reversible electric motor 80 the screw shaft member 46 will be rotated effecting longitudinal sliding movement of the slide member 48 along the tubular member 38. In this manner, the entire power head assembly and shaft housing 92 may be pivoted about the upstanding axis and in addition the swivel connection of the third motor means 34 with the transom 18 will enable the power head 24 to be tilted and oscillated about the pivot shaft or pin 26.

Figure 3:
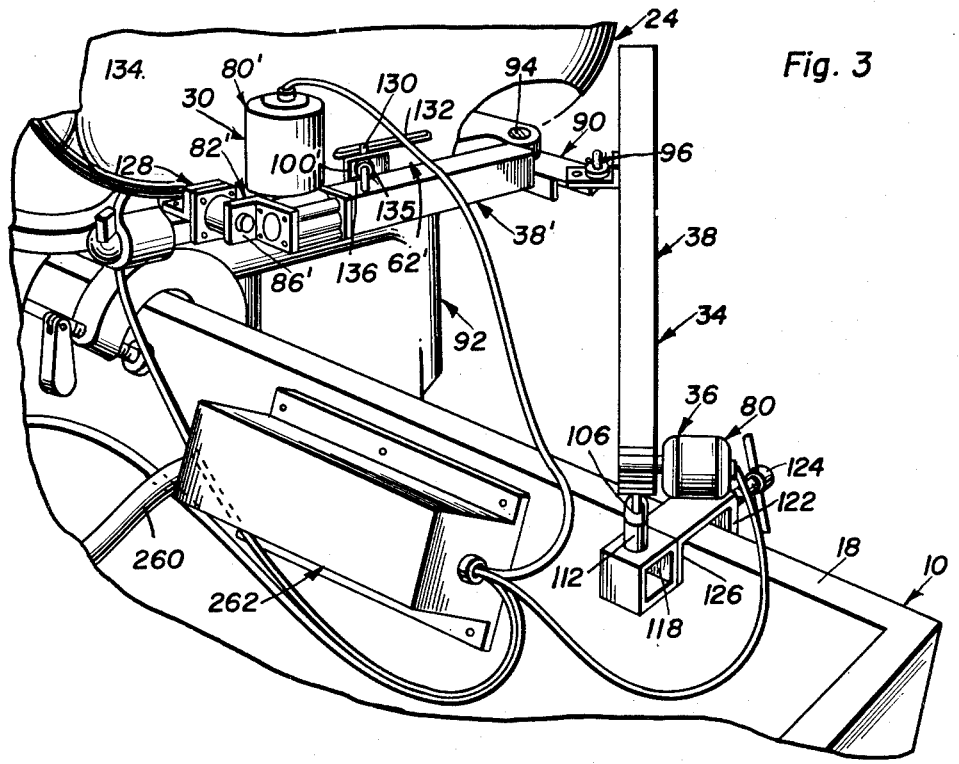
FIGURE 3 is a fragmentary perspective view of the aft portion of the boat showing the manner in which the first and third motor means of the remote control assembly may be operatively connected to the throttle and the steering controls of the outboard motor.
Figure 4:
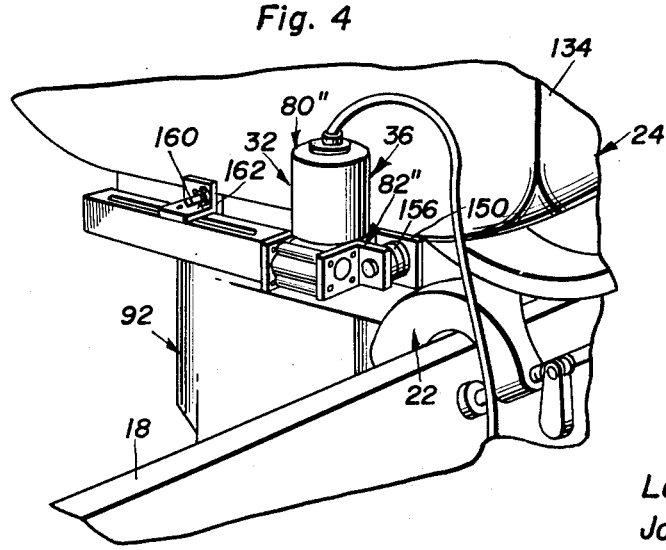
FIGURE 4 is a fragmentary perspective view of the aft portion of the boat as seen from the other side of the outboard motor and showing the manner in which the second motor means may be operatively connected to the shift control of the outboard motor.

With reference now to FIGURE 3 of the drawings, it may be seen that the first motor means 30 has its flange 86' of the mounting bracket 82' pivotally secured to the power head assembly 24 by means of a pivot mounting assembly generally referred to by the reference numeral 128. Accordingly, the third motor means 30 may be pivoted about a horizontally disposed axis extending transversely of the power head assembly 24. However, in some instances the pivoting mounting assembly 128 is not required as will be hereinafter more fully set forth.

The power head assembly 24 includes a throttle arm 130 whose inner end is received through a slot 132 in the power head cover 134 and is operatively connected to the throttle of the outboard motor 20. The mounting bracket 62' of the first motor means 30 includes an upstanding flange 100' and the flange 100' is provided with an opening (not shown) through which the free end of the throttle arm 130 is slidingly received. A stop washer 135 is secured on the free end of the throttle arm 130 outwardly of the flange 100' by means of a cotter pin 136 and it will be noted that the opening formed in the flange 100' is sufficiently large to loosely receive the free end of the throttle arm 130. Accordingly, as the flange 100' is reciprocated longitudinally of the tubular member 38' of the first motor means 30, the free end of the throttle arm 130 will be oscillated. Therefore, upon operation of the reversible motor 80' of the first motor means 30, the throttle arm 130 may be adjusted as desired.

With attention now directed to FIGURES 4 and 8 through 11, of the drawings, it will be seen that the second motor means generally referred to by the reference numeral 32 has its mounting bracket 82" pivotally secured to a pivot mount assembly generally referred to by the reference numeral 140 which is in turn secured to the upper end of the shaft housing 92 by means of a fastener 142 in the same manner in which the steering bracket assembly 90 is secured to the shaft housing 92. Accordingly, it may be seen that the second motor means generally referred to by the reference numeral 32 is pivotally mounted to the outboard motor 20 for movement about an axis extending at right angles to the flange 86" of the mounting bracket 82".

It will be noted that the pivot mount assembly 140 includes an L-shaped bracket 144 whose leg 146 is secured to the shaft housing 92 by means of fastener 142 and whose leg 148 is secured to a pivot plate 150 by means of fasteners 152. The flange 86" is then pivotally secured to the pivot plate 150 by means of a pivot fastener 154. It will be noted that a plurality of washers 156 are disposed about the pivot fastener 154 between the confronting surfaces of the flange 86" and the pivot plate 150.

The flange 60" of the mounting bracket 62" is secured to the slide member 48" by means of fasteners 58" and the flange 100" is provided with an upstanding elongated slot 158. The slot 158 slidably and rotatably receives the pivot pin 160 which projects laterally outwardly from the shift lever 162 of the outboard 20. Accordingly, upon reciprocation of the mounting bracket 62" longitudinally of the tubular member 38" the shift lever 162 will be oscillated as desired.

As hereinbefore set forth, the threads on each of the screw shaft members such as that indicated at 46 in FIGURE 6 may have threads formed thereon of different pitch and it will be noted that the threads on the screw shaft members of the second and third motor means 32 and 34 will have a relatively great pitch in order that the shift mechanism of the outboard motor 20 may be rapidly actuated which is the correct procedure inasmuch as outboard transmissions are not provided with clutch assemblies such as those used in automotive vehicles and in order that the outboard motor 20 and shaft housing 92 may be rapidly pivoted about an upstanding axis by means of the third motor means for steering the boat 10.

With attention now directed to FIGURES 12 through 15 of the drawings there will be seen a control panel generally referred to by the reference numeral 164 which is portable and includes a housing generally referred to by the reference numeral 166. The housing 166 comprises a base portion generally referred to by the reference numeral 168 and a cover portion generally referred to by the reference numeral 170. First, second and third pairs of actuating control means each including a pair of switches 172 and 174 and referred to in general by the reference numerals 176, 178 and 180 respectively are disposed in the housing 166. Each of the switches 172 and 174 is adapted to bridge a pair of contacts for actuating the corresponding electric motor in one direction. The housing 166 is connected to a suitable source of electrical potential generally referred to by the reference numeral 182 such as a battery disposed in the boat 10 and the wire 184 is utilized to connect the trunk line 186 which is carried by the base portion 168 with the battery 182. An ignition switch 188 is disposed in the wire 184 and is provided with a conventional lock mechanism 190 whereby the portable remote control panel 164 may be locked. The trunk line 186 includes a plurality of contacts 192 which service the first, second and third pairs of actuating control means and a plurality of contacts 194 which may be electrically connected to the corresponding contacts 192 by means of the bridging switches 172 and 174. The control panel 164 also includes a pair of push buttons 196 and 198 and each push button may be used to bridge the corresponding contacts 200 carried by the trunk line 186 and the corresponding contact 202.

One end of a wire 204 is secured to each of the contacts 194 on the left side of the trunk line 186 and one end of a wire 206 is connected to each of the contacts 194 disposed on the right side of the trunk line 186 as viewed in FIGURE 14. The ends of the wires 204 and 206 remote from the contacts 194 enter the relay panel generally referred to by the reference numeral 208 and a trunk line 210 is disposed in the relay panel 208 and is also connected to the positive terminal of the battery 182.

It may be seen that each of the reversible motors 80, 80' and 80" has a pair of hot wires 212 and 214 connected thereto and it will be noted that the opposite ends of the wires 212 and 214 extend into the relay panel and that each is connected to a corresponding terminal 216. Additionally, a ground wire 218 connects each of the reversible electric motors 80, 80' and 80" to the ground trunk line 220 which has one end disposed in the relay panel and the other end connected to the ground terminal of the battery 182. A pair of electric solenoids 222 and 224 are provided for each of the reversible electric motors and each has a ground wire 226 connected to the ground and trunk line 220. Each of the wires 204 is connected to the corresponding solenoid 224 and each of the wires 206 is electrically connected to the corresopnding solenoid 222. Accordingly, it may be observed that upon movement of each of the switches 172 the corresponding contacts 192 and 194 will be bridged thus electrically connecting the corresponding solenoid 222 to the battery 182. Accordingly, the armature 228 of the corresponding solenoid 222 will electrically connect the corresponding wire 212 with the trunk line 210 to effect operation of the corresponding electric motor in one direction. Then, upon release of the switch 172 and the depressing of the corresponding switch 174, the solenoid 224 will be electrically connected to the battery 182 and will thus electrically connect the corresponding reversible electric motor to the battery 182 by means of the wire 214 effecting operation of that motor in the opposite direction.

From FIGURES 12 and 13 of the drawings it may be seen that the first, second and third pairs of actuating control means may each be actuated by means of a rocker bar 230 which is pivotally mounted in the housing 166 by means of pivot pin 232. It is to be understood that the spring means 234 is provided for each rocker bar 230 to urge the rocker bar toward a normal position with each of the corresponding switch bars 172 and 174 spaced from the corresponding contacts 192 and 194. Thus, it may be seen that each of the rocker bars 230 may be actuated to alternately effect operation of the corresponding reversible electric motor in opposite directions.

The contact 202 on the right side of the trunk line 186 as viewed in FIGURE 14 has a wire 236 connected thereto and the other end of the wire 236 is connected to the starter solenoid 238. The starter solenoid 238 is electrically connected to the regulator 240 by means of wire 242 and accordingly, it will be noted that the push button 196 may be utilized to actuate the starter solenoid 238 by bridging the corresponding contacts 200 to 202. Further the contact 202 on the left side of the trunk line 186 as viewed in FIGURE 14 has a wire 244 connected thereto and the remote end of the wire 244 is connected to a choke relay 246 for actuating the choke solenoid 248. The choke solenoid 248 is connected to the choke relay by means of wire 250 and the choke relay 246 is connected to the regulator 240 my means of wire 252. The regulator is connected to the ground terminal of the battery 182 by means of wire 254 and to the positive terminal of the batery 182 by means of wire 256.

With attention again directed to FIGURE 12 of the drawings it will be noted that wires 184, 204, 206, 236, and 244 are encased in a covering 260 which is flexible and waterproof. Therefore, it may be seen that the control panel 164 may be readily held in the hand of a boat pilot and actuated to control the movement of the boat 10. When it is desired to start the outboard motor 20, the lock assembly 190 may be actuated to close the ignition switch 188, Then, the choke push button 198 may be depressed while simultaneously depressing the starter push button 196. It is of course to be understood that the gear shift lever 162 will have previously been placed in the neutral position by means of the reversible electric motor carried by the second motor means 32 and also that the throttle arm 130 will have been moved to the idle position by means of the reversible electrical motor 80′ of the first motor means 30. After the outboard motor 20 has been started, the starter and choke push buttons 196 and 198 may be released. Then, the electric motor of the second motor means 32 may be actuated to shift the transmission of the outboard motor 20 as desired. Thereafter, the electric motor 80′ of the motor means 30 may be actuated to swing the throttle arm 130 in order to incerase the operating speed of the outboard motor 20.

As previously set forth, the remote control assembly 136 may be readily adapted for use with inboard motor boats and operatively connected to the movable throttle, shift and steering controls thereof. In addition, it will be noted that the remote control 36 may be readily installed in motor boats and transferred from one motor boat to another.

With attention now directed to FIGURE 3 of the drawings it will be noted that the relay panel 208 may be suitably encased in a housing generally referred to by the reference numeral 262 and that the housing 262 may be secured in any suitable portion of the boat such as to the transom 18.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a boat having a dirigible and tiltable outboard motor secured thereto including a mount supported from said boat and providing tilting movement of said motor about a generally horizontally disposed axis and from which said outboard motor is pivotally supported for movement about an axis disposed generally normal to the first mentioned axis, a remote control assembly for swinging said outboard motor relative to said mount about the second mentioned axis including elongated, extensible and reversible motor means, one end of said motor means including means defining a universal coupling securing said one end to said boat and means on the other end pivotally supporting said other end from said outboard motor for swinging movement about an axis generally paralleling the second mentioned axis, wherein said motor means includes first and second members mounted for movement relative to each other and supported from an elongated support member, said support member including one end comprising said one end of said motor means, said first member of said motor means comprising a screw shaft journalled for rotation from said support member and extending longitudinally thereof, said second member comprising a follower slide member threadedly engaged with said screw shaft and slidingly guided by said support member for movement longitudinally thereof, said follower slide member comprising the other end of said motor means.

2. The combination of claim 1 including a reversible electric motor supported from said elongated support member and drivingly connected to said screw shaft.

3. The combination of claim 2 wherein said electric motor is drivingly connected to said screw shaft by means of a friction clutch assembly.

4. In combination with a boat having a dirigible and tiltable outboard motor secured thereto including a mount supported from said boat and providing tilting movement of said motor about a generally horizontally disposed axis and from which said outboard motor is pivotally supported for movement about an axis disposed generally normal to the first mentioned axis, a remote control assembly for swinging said outboard motor relative to said mount about the second mentioned axis including elongated, extendible and reversible motor means, one end of said motor means including means defining a universal coupling securing said one end to said boat and means on the other end pivotally supporting said other end from said outboard motor for swinging movement about an axis generally paralleling said second mentioned axis, said motor means including first and second members mounted for movement relative to each other and supported from an elongated support member, said support member including one end comprising said one end of said motor means, said first member of said motor means comprising a screw shaft journalled for rotation from said support member and extending longitudinally thereof, said second member comprising a follower slide member threadedly engaged with said screw shaft and slidingly guided by said support member for movement longitudinally thereof, said follower slide member comprising the other end of said motor means, a reversible electric motor supported from said elongated support member and drivingly connected to said screw shaft, said outboard motor including throttle and shift controls having actuators mounted on and movable relative to said outboard motor, a pair of throttle and shift actuator motor means each also including a screw shaft journalled for rotation from an elongated support member and having a follower slide member threadedly engaged therewith and slidably guided for movement longitudinally of the corresponding support member and a reversible electric motor drivingly connected thereto, means pivotally connecting one end of the throttle and shift motor means support members to said outboard motor and operatively connecting the last mentioned follower slide members to said throttle and shift actuators for movement of said actuators in response to operation of the last mentioned electric motors.

5. The combination of claim 4 wherein said electric motors are each drivingly connected to the corresponding screw shaft by means of a friction clutch assembly.

6. The combination of claim 4 including a portable control assembly having a control panel with actuators for each of said electric motors operatively connected thereto for selectively effecting operation of said electric motors.

7. The combination of claim 6 wherein said outboard motor includes an ignition circuit, a starting motor circuit and a carburetor choke circuit, said control panel including first, second and third switch means disposed in said ignition, starting motor and carburetor circuits respectively.

References Cited in the file of this patent
UNITED STATES PATENTS

| | | |
|---|---|---|
| 2,700,358 | Johnson | Jan. 25, 1955 |
| 2,703,989 | Schroeder | Mar. 15, 1955 |
| 2,804,838 | Moser | Sept. 3, 1957 |
| 2,909,146 | Strang | Oct. 20, 1959 |
| 2,916,008 | Bauer | Dec. 8, 1959 |
| 2,987,656 | Handshuh | June 6, 1961 |